Figure 1:
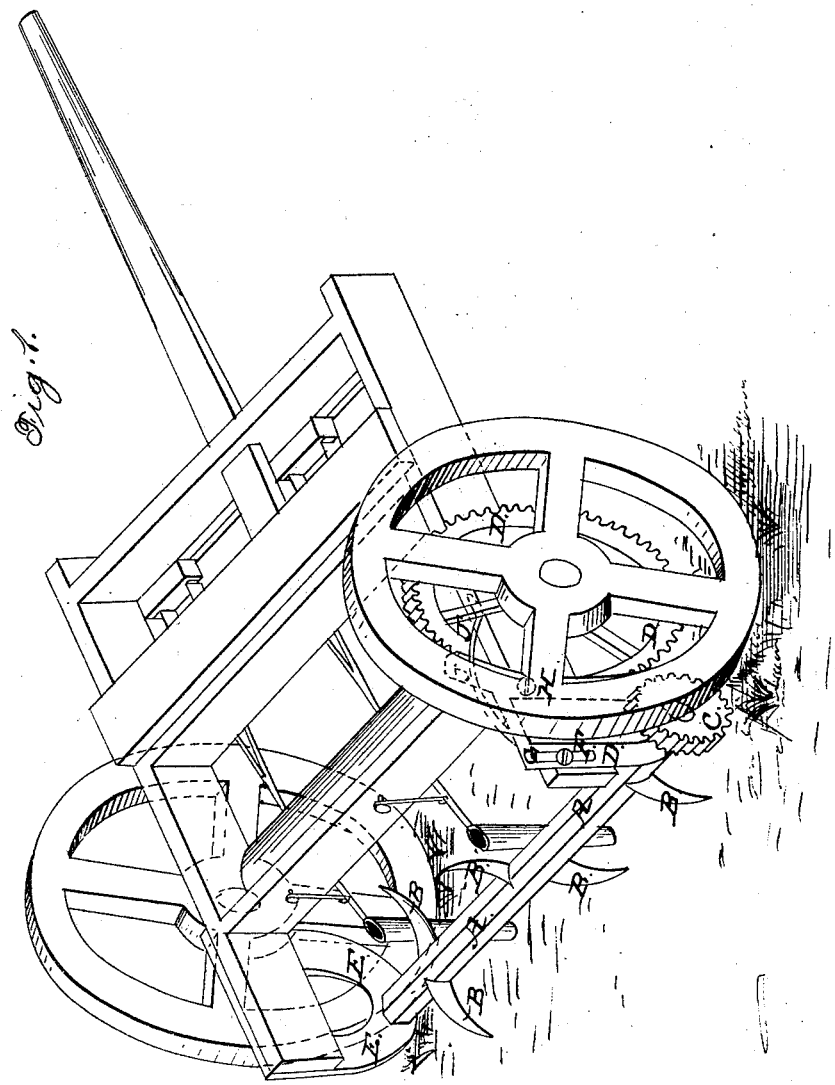

H. F. BAKER.

Grain-Drill

No. 19,010.

2 Sheets—Sheet 1.

Patented Jan 5, 1858.

WITNESSES:
Thomas Mears,
C. S. M'Enahan

INVENTOR:
Henry F. Baker

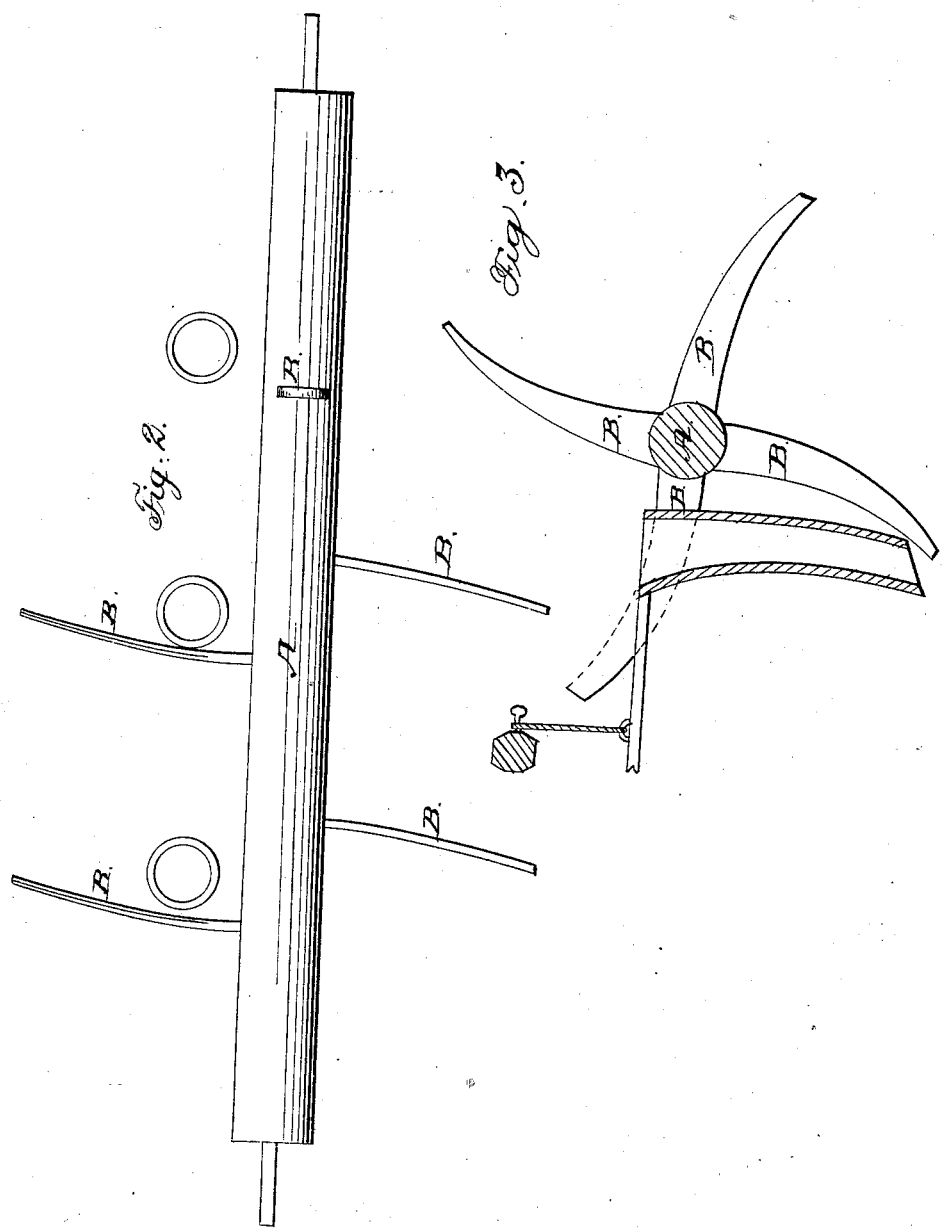

UNITED STATES PATENT OFFICE.

HENRY F. BAKER, OF CENTREVILLE, INDIANA.

IMPROVEMENT IN SEED-PLANTERS.

Specification forming part of Letters Patent No. 19,010, dated January 5, 1858.

*To all whom it may concern:*

Be it known that I, HENRY F. BAKER, of Centreville, in the county of Wayne and State of Indiana, have invented a new and useful Improvement in the Clearers of Seed-Drill Teeth; and I do hereby declare that the following is a full, clear, and exact description of the same, reference being had to the accompanying drawings, forming part of this specification, in which—

Figure 1 is a perspective view of a seed-drill with my improvements applied to it. Fig. 2 is a detached plan view of a series of seed-drill teeth and my improved clearers, and Fig. 3 a vertical longitudinal section of the same.

Similar letters of reference in each of the several figures indicate corresponding parts.

The nature of my invention consists in the arrangement of hook-pointed edged blades or clearers in such relation to the points of the drill-teeth and in such relation to one another on the shaft that in the revolution of the shaft they alternately come on opposite sides of the teeth and pass down slightly below the points of the same and cut their way through the soil, and in their return catch up grass, weeds, stubble, or any other obstructions to the entrance of the seed into the soil and throw them in the rear of the machine.

To enable others skilled in the art to make and use my invention, I will proceed to describe its construction and operation.

A represents a revolving shaft arranged in rear of the drill-teeth being supported by bearings D E of the drill-frame.

B B are the blades or clearers, arranged radially on the shaft A. These clearers are made with a sharp edge, and with a slight hook form at their lower end, and are of sufficient length to pass a short distance below the points of the teeth. Two of these clearers are provided for each seed-drill tooth, one being arranged to pass down on the right side and the other on the left side of the tooth. These blades are arranged on the shaft in such a manner that only one of each tooth is allowed to be in operation at the same time. This is essential in order that the grass, weeds, or other obstructions may be drawn round from the front to one side of the teeth, and also that both sides of the teeth shall be kept perfectly clear from obstructions. This could not be effected if both blades of each tooth were in operation together, because one would be acting against the other and the grass or obstructions would be pressed against the front of the teeth and the machine clogged, as well as the deposit of the seed into the soil prevented. Neither would it be effected as perfectly if the clearers passed down one side of the teeth only, for then a chance remains for some obstruction adhering to one side of the teeth.

C is a pinion on the end of the clearer-shaft. This pinion gears into a spur-wheel, E, on the axle of the propelling-wheels and receives motion therefrom and transmits it to the clearer-shaft. The bearing D is adjustable, so that the pinion may be thrown in and out of gear. The adjustment is effected by a curved slot, G, and adjusting-lever I of bearing D, and stop-bar J.

From the above description of parts it will be seen that as the shaft $a$ revolves the knives or clearers come alternately on opposite sides of the drill-teeth and cut their way through the soil, and in their return or escape above the soil catch up the obstructions to the seed and throw them in the rear of the drill.

I do not claim, broadly, the use of clearers in combination with seed-drill teeth, as this is common; but What I do claim as my invention, and desire to secure by Letters Patent, is—

The arrangement of hook-pointed edged blades or other suitable clearers in such relation to the points of the drill-teeth and in such a relation to one another on the shaft that in the revolution of the shaft they alternately come on opposite sides of the teeth and pass down slightly below the points of the same, substantially as and for the purposes set forth.

HENRY F. BAKER.

Witnesses:
THOMAS MEANS,
C. S. MCMAHON.